April 6, 1965  E. B. LIPSKI  3,176,992
RECORD FEED MECHANISM
Filed July 24, 1962  4 Sheets-Sheet 1
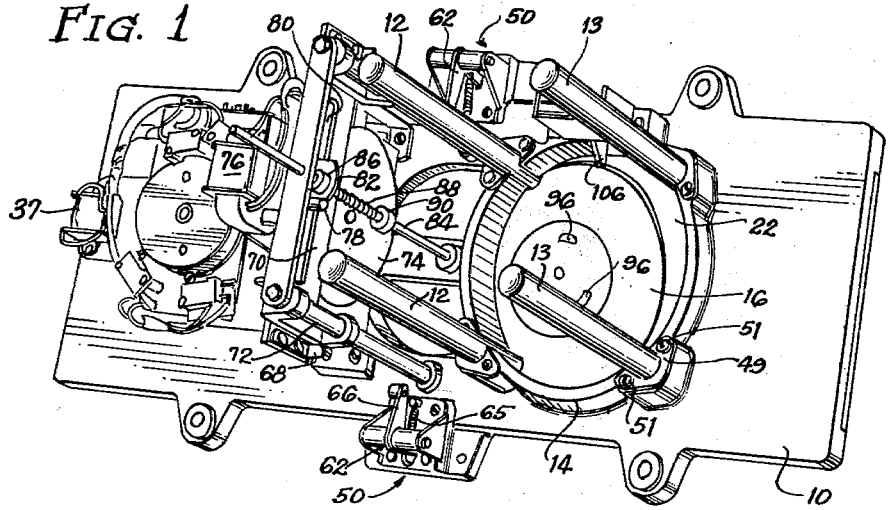
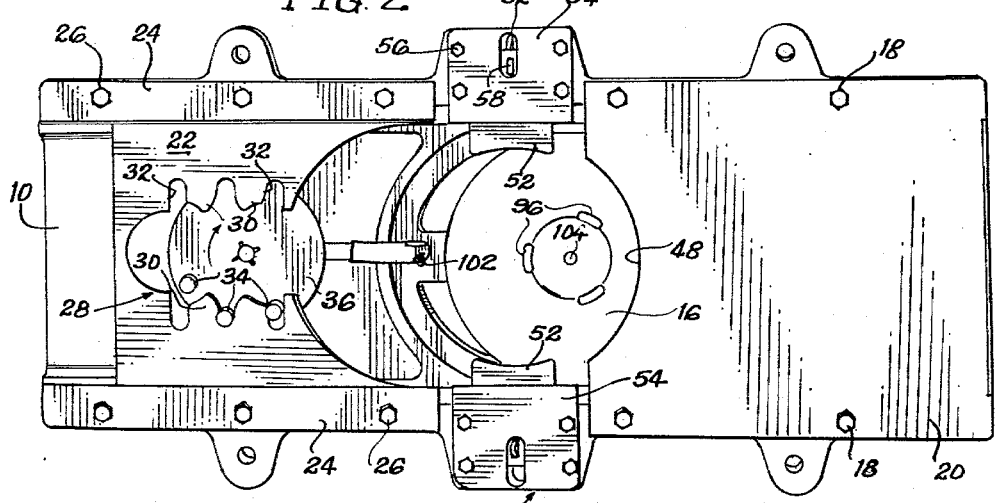
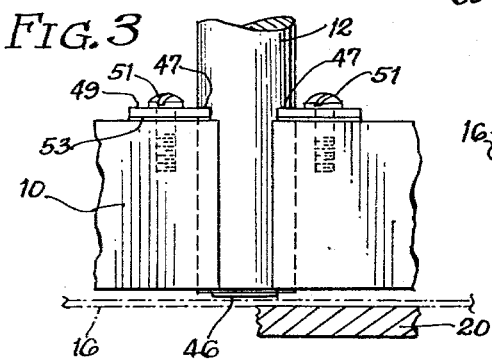
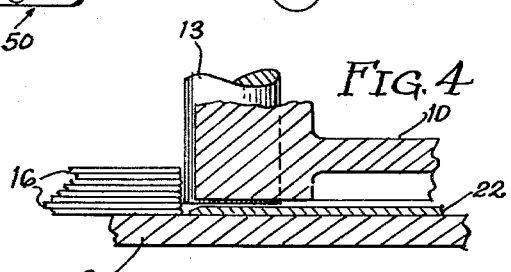
INVENTOR.
Edward B. Lipski
BY Ooms, McDougall
and Hersh
Att'ys April 6, 1965 E. B. LIPSKI 3,176,992
RECORD FEED MECHANISM
Filed July 24, 1962 4 Sheets-Sheet 2

INVENTOR.
Edward B. Lipski

April 6, 1965     E. B. LIPSKI     3,176,992
RECORD FEED MECHANISM
Filed July 24, 1962     4 Sheets-Sheet 3
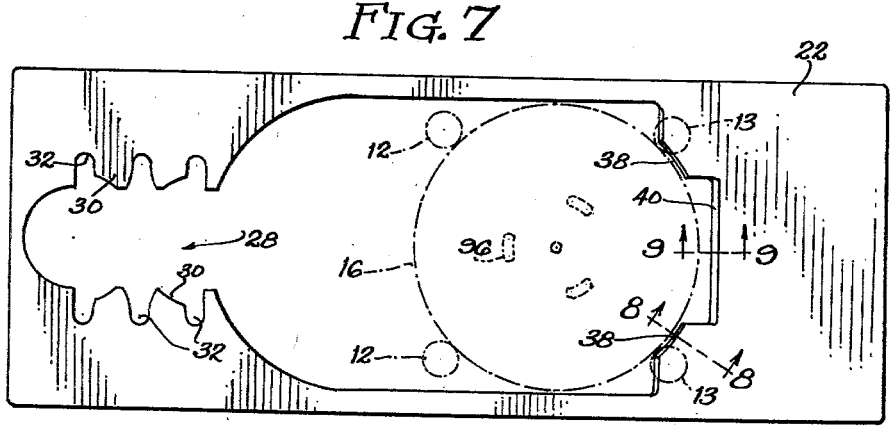
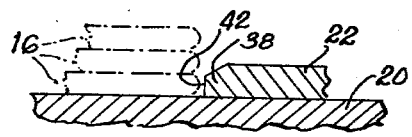
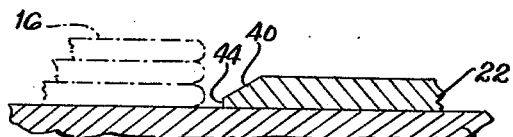
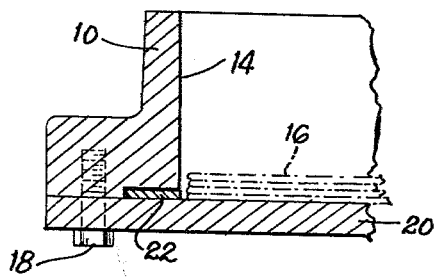
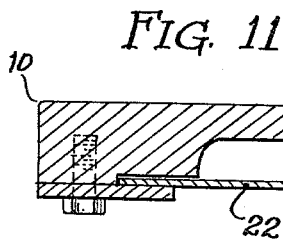
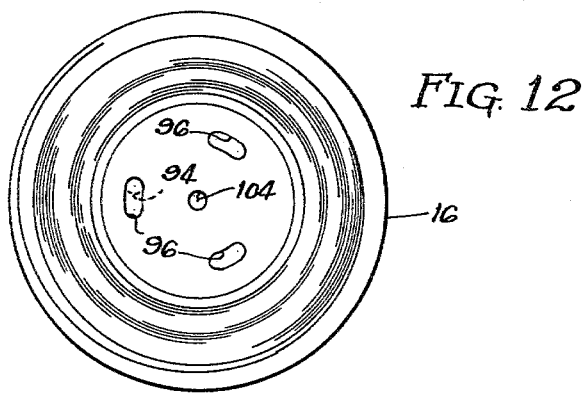
INVENTOR.
Edward B. Lipski
BY Ooms, McDougall
and Hersh
Attys

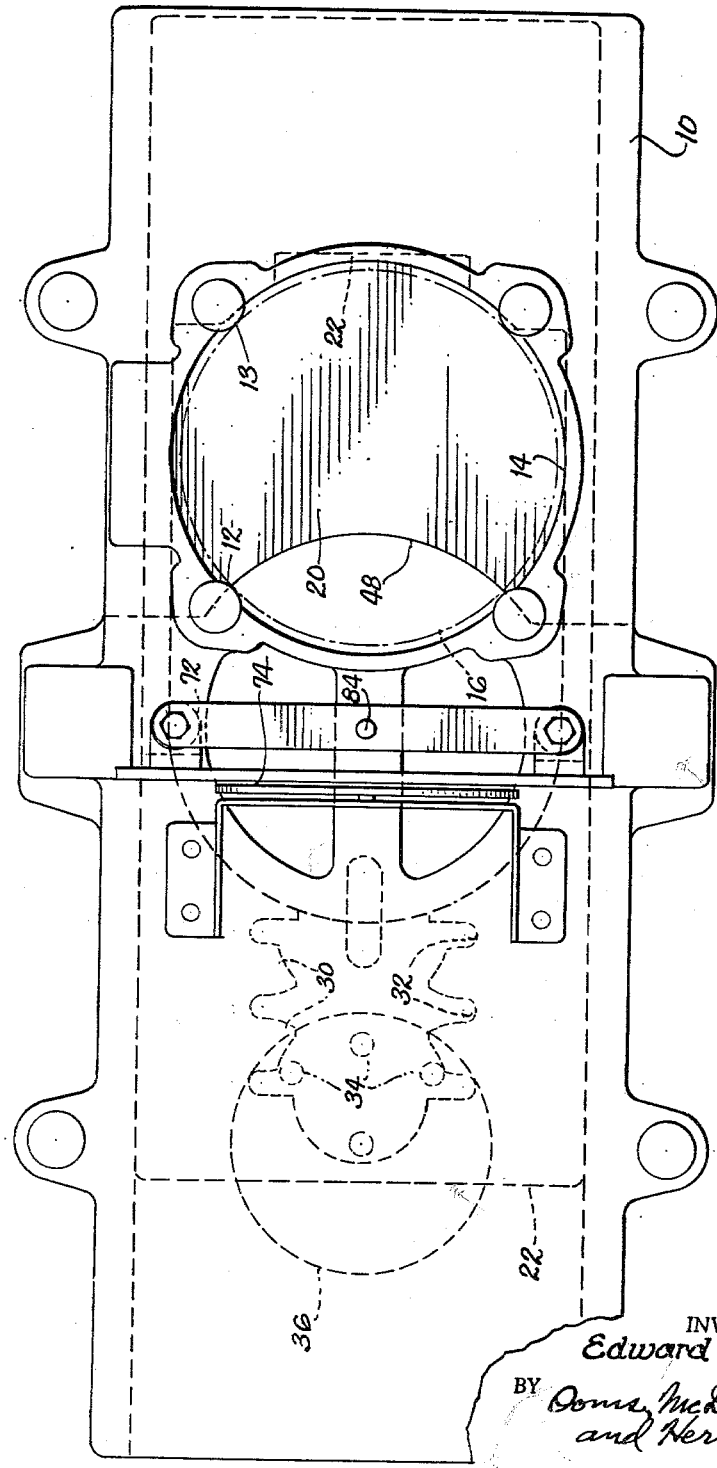

United States Patent Office 3,176,992
Patented Apr. 6, 1965

3,176,992
RECORD FEED MECHANISM
Edward B. Lipski, Oak Lawn, Ill., assignor to Williams Electronic Manufacturing Corp., Chicago, Ill., a corporation of Illinois
Filed July 24, 1962, Ser. No. 212,017
15 Claims. (Cl. 274—10)

This invention relates to a mechanism for feeding record blanks to a position whereby a recording can be made thereon. The invention is particularly directed to a mechanism which can be employed in a record vending machine whereby an individual can make a recording and then receive the completed record for his own use.

Record vending machines have been designed in the past and certain of these are adapted to provide a recording which can be used by the individual making the recording or which can be passed on to others. Major difficulties exist, however, in present designs for recording machines of the type referred to. In particular, problems concerning capacity of the machine, maintenance and reliability of operation are considerable. Thus, many units are incapable of retaining a large number of record blanks and, therefore, frequent reloading of the machines is necessary. Other designs require the use of relatively complex parts or involve complicated operating cycles and, therefore, demand a great deal of maintenance. In addition, the reliability of operation of mechanisms of this type is generally not good, largely due to their relatively complex nature.

It will be appreciated that frequent attention for reloading and maintenance purposes will materially add to the cost of upkeep of a recording machine and, of course, a complex structure will contribute greatly to the original cost of the machine. As a result of these factors, a relatively high price per record, or an unreasonably low profit, has been the general rule where prior devices have been installed.

It is an object of this invention to provide an improved recording machine characterized by a record feed mechanism of the type which enables more reliable, efficient and economical operation.

It is an additional object of this invention to provide a record feed mechanism which is adapted to operate reliably in machines which contain a large number of record blanks and which is composed of a relatively few non-complex components whereby frequent reloading and maintenance is unnecessary and whereby a highly efficient and economical operation is possible.

These and other objects of this invention will appear hereinafter and, for purposes of illustration, but not of limitation, specific embodiments of this invention are shown in the accompanying drawings, in which—

FIGURE 1 is a perspective view, looking downwardly, of a record feed mechanism having the characteristics of this invention;

FIGURE 2 is a bottom plan view of the mechanism shown in FIGURE 1;

FIGURE 3 is an enlarged fragmentary view, partly in section, illustrating the clearance features of pillars employed in the magazine for the record blanks;

FIGURE 4 is an enlarged fragmentary view, partly in section, illustrating the relationship of a sliding feed plate and a stack of record blanks prior to a feeding operation;

FIGURE 7 is a detail view of the slide plate employed in the record feeding operation;

FIGURE 8 is an enlarged fragmentary view in section taken about the line 8—8 of FIGURE 7;

FIGURE 9 is an enlarged fragmentary view in section taken about the line 9—9 of FIGURE 7;

FIGURE 10 is an enlarged fragmentary view in section illustrating the relationship of the sliding plate and record blank magazine for the machine;

FIGURE 11 is an enlarged fragmentary view in section illustrating a different portion of the sliding plate and its relationship with the machine;

FIGURE 12 is a plan view illustrating a record after completion of the recording cycle; and FIGURE 13 is a plan view of the mounting plate for the components which make up the novel feed mechanism.

Figures 5, 6:
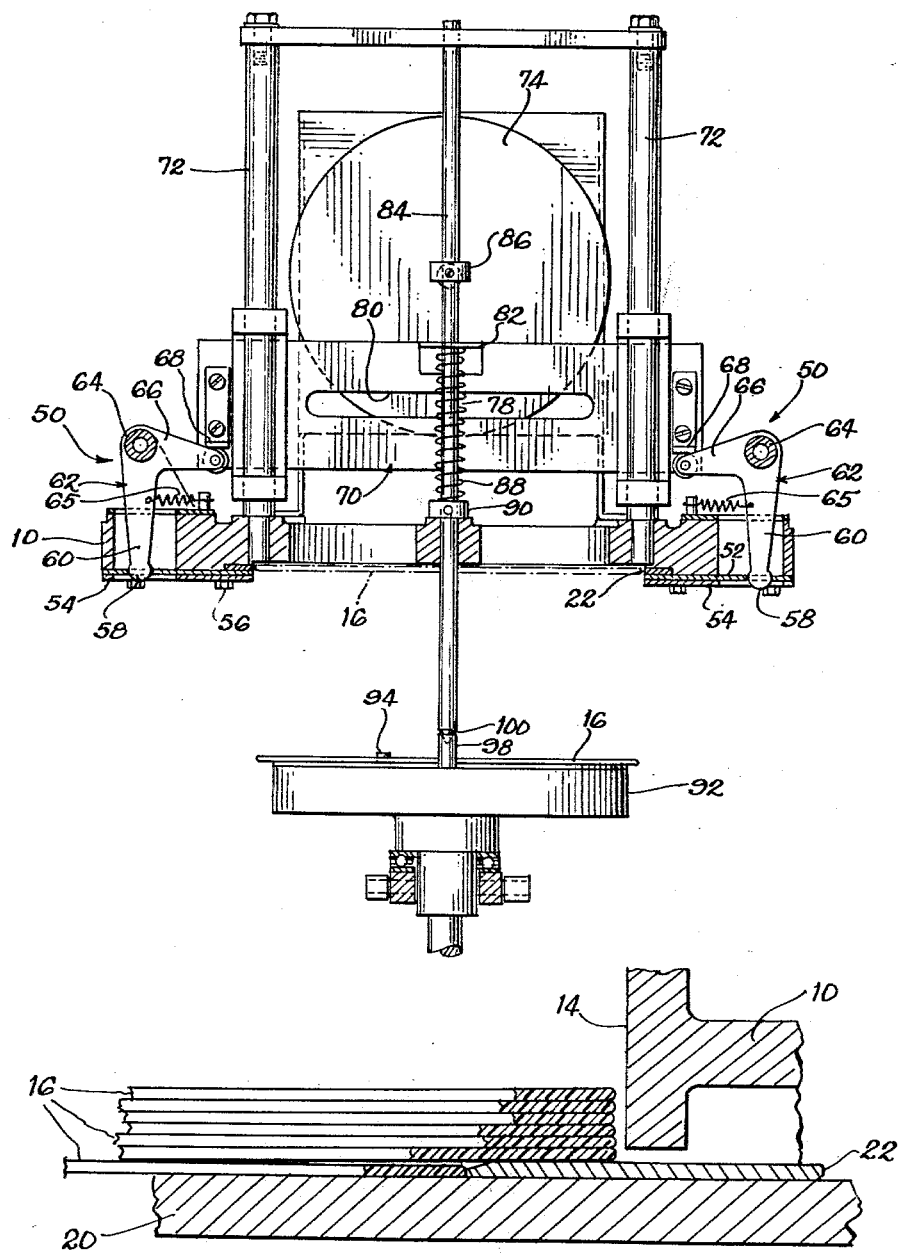
FIGURE 5 is an elevational view, partly in section, illustrating the feed mechanism and its relationship with a recording turntable.
FIGURE 6 is an enlarged fragmentary view, partly in section, illustrating the sliding feed plate after initiation of a feeding operation.

The apparatus of this invention is adapted to feed record blanks to a recording turntable whereby a recording can be made thereon by an individual. In the ordinary application of the mechanisms of this invention, a plurality of record blanks are disposed in a magazine, and the feeding mechanism is adapted to deliver one of these record blanks when certain delivery conditions prevail. Where the mechanism is employed in a vending machine, these conditions will, of course, include the depositing of a particular amount of money whereby a vending cycle can be initiated.

The specific mechanism making up the novel feed structure includes a plate construction having an open interior and a separate sliding plate movable in a reciprocal manner within this interior. The sliding plate is provided with an opening which is sufficiently large to receive a record blank. This plate is adapted to be moved whereby the opening therein can be disposed adjacent the magazine holding the record blanks. Abutting edges on the plate are adapted to engage a record blank and to move the blank out of the magazine.

An opening is also formed in the plate construction, this opening also being sufficiently large to receive a record blank. The sliding plate opening having a record blank received therein is adapted to move into registry with the construction opening. Means are provided for holding the record blank in position within these registered openings until a spindle rod can be passed through a hole in the center of the record blank and into position adjacent a turntable disposed beneath the registered openings. Upon release of the record blank held therein, the spindle rod is adapted to guide the blank to its position on the turntable and the recording operation can then commence.

In the accompanying drawings, there is shown a mounting plate 10 which is provided for holding various mechanisms representing a specific embodiment of this invention. These mechanisms include a plurality of pillars comprising a front pair 12 and a rear pair 13 which define with an annular wall 14 a magazine for a stack of record blanks 16.

Secured to the mounting plate 10 by means of bolts 18 is a plate 20. A narrow space extends in the area between this plate and the plate 10, this space defining an opening for one portion of a slide plate 22. This slide plate extends substantially throughout the length of the plate 10, and is partially confined at its edges by means of laterally disposed bars 24 which are secured at the other end of the plate 10 by means of bolts 26. The plates 10 and 20 and the bars 24 thus make up a construction for confining the movement of the plate 22.

The slide plate 22, best shown in FIGURE 7, includes a large cut away center portion terminating at one end in a toothed section 28. The teeth 30 thereof define grooves 32 which are adapted to receive pins 34 disposed on the rotary disk 36. Engagement of the pins with the teeth 30 during rotation of the disk 36 results in reciprocal movement of the slide plate for reasons which will be discussed hereinafter. A motor 37 provides for rotation of the disk 36.

At the opposite end of the cut away portion of the slide plate there are defined engaging edges 38 and 40. The pair of edges 38 are beveled to provide relatively blunt pusher ends 42. As shown in FIGURE 8, these ends 42 are approximately as thick as a record blank 16.

The engaging edge 40 is also beveled, but a relatively narrow end 44 is provided on this edge. This sharper edge forms a separating means which is adapted to move under the stack of records piled over the record being pushed by the edges 38.

The bottom ends 46 of the front pair of pillars 12 are adapted to extend into the space defined between the plates 10 and 20. These ends are spaced from the plate 20 a distance slightly greater than the thickness of a single record blank, but less than the thickness of two record blanks. Accordingly, a single blank is free to be moved beneath these front pillars when pushed by the slide plate. The spacing also permits removal of blanks from the magazine which are slightly warped but which otherwise are perfectly capable of providing a satisfactory recording.

Grooves 47 are cut in the pillars 12 and are adapted to receive C-shaped spacer plates 49 which are connected to the plate 10 by means of screws 51. These spacer plates hold the pillars 12 in position with respect to the plate 10. One or more C-shaped shims 53 can be inserted as shown to provide minute adjustments of the space between the ends 46 of the pillars and the plate 10.

The cut out edge 48 of the plate 20 defines a curve corresponding to a record blank 16. Accordingly, movement of a record blank by the slide plate from the magazine formed by the plate 10 will enable the blank to clear the plate 20. However, a pair of release mechanisms 50 are provided in order to prevent the blank from dropping downwardly as soon as it clears the plate 20. The release mechanisms (best shown in FIGURE 5) include drop plates 52 which are slidable in spaces formed between the mounting plate 10 and thin plate members 54 secured to the mounting plate by means of bolts 56. The drop plates 52 receive knobs 58 formed in the ends of crank arms 60 of the cranks 62. Pivoting of the cranks about the fulcrums 64 transmits reciprocal movement to the drop plates 52. Tension springs 65 normally bias the drop plates to a position blocking the opening in the bottom of the construction.

Pivotal movement of each of the cranks 62 results from engagement of the crank arms 66 with abutment means 68 fastened to a cross member 70. This cross member is disposed for vertical movement on a pair of posts 72 mounted on the plate 10. A drive disk 74, which is adapted to be rotated through operation of motor 76, includes a pin 78 which rides in a slot 80 formed in the cross member 70. Rotation of the disk and the action of the pin 78 imparts vertical movement to the cross member 70, this movement being confined by the post 72.

A centrally located, out-turned member 82 is formed on the cross member 70. A vertically disposed spindle rod 84 passes through the out-turned member and through a sleeve 86 secured to the rod. The out-turned member 82 engages the sleeve 86 during vertical upward movement of the cross member 70 thereby raising the rod 84. A spring 88 is located between the member 82 and a second sleeve 90 secured at a lower point on the rod 84. FIGURE 1 illustrates the rod position with the cross member 70 raised, and FIGURE 5 shows these means in a lowered position.

The rod 84 is centrally located with respect to record blanks when they are disposed over the opening which is defined in part by the edge 48 of the plate 20 (see FIGURES 2 and 12). Disposed beneath the opening is a turntable 92 upon which the record blanks rest during recording. A drive pin 94 on the surface of the turntable is adapted to be inserted in one of the openings 96 in the record blank to provide for rotation of the blank with the turntable. A recessed guide pin 98 on the turntable is adapted to receive the tapered end 100 of the rod 84 when the rod is lowered. The end 100 is preferably not in direct contact with the pin 98 in order to provide driving clearance during recording.

In the illustrated mechanism a record blank is adapted to be cut in the first stage of the cycling so that there is no delay for placing a blank in position on the turntable. Accordingly, in the explanation of the operation, it will be assumed that a record blank is in position on the turntable 92. Furthermore, a stack of record blanks is provided in the magazine defined between pillars 12 and 13 and by the annular wall 14. The unit ordinarily operates as a vending machine and, accordingly, the parts thereof are adapted to function when the proper amount of money has been inserted in the machine.

Once the vending condition is realized, a recording arm (not shown) is adapted to move over the blank on the turntable 92 to cut a record while an individual speaks into a microphone. When the recording is completed, the motor 76 operates to rotate the disk 74 and the cross member 70 is, therefore, raised. When the out-turned member 82 on the cross member contacts the sleeve 86, the rod 84 is raised away from the guide pin 98 and clearance is therefore provided for removal of the record blank from the turntable.

Continued movement of the disk 74 raises the rod 84 so that the end 100 thereof is moved above the record blank shown in dotted lines in FIGURE 5. The motor 76 then stops whereby the rod 84 is held in position until the next record blank is moved beneath it.

The next record blank is positioned through operation of motor 37 which provides for rotation of disk 36. Through engagement of the pins 34 on the disk 36 with the teeth 30, the sliding plate 22 is moved and the pusher edges 38 engage the blank located on the floor of the magazine. Due to the spacing of the ends 46 on the pillars 12 from the plate 10, only a single blank can be moved out of the magazine at one time.

The beveled edges 38 and 40 cooperate to provide for separation of the lower blank from an adjacent blank. These bevels extend completely across the rearward end of the blank and any sticking of adjacent records can be overcome whereby the possibility of the mechanism failing to deliver a blank is greatly minimized.

The leading end of the blank is adapted to engage switch 102 when it reaches a position beneath the rod 84 and the motor 37 stops at this time. With the blank in this position, the central opening 104 therein will be located whereby lowering of the spindle rod 84 will result in movement of the end 100 thereof through this opening. The switch 102 serves as a means for insuring proper operation of the machine, since the operation of the motor 76 will not be initiated until this switch is actuated. Accordingly, if a record blank is not moved into the proper position by the slide 22 for ultimate transfer to the turntable 94, the machine will not operate to complete any further steps in the cycle. Preferably an "out of order" or "empty" signal will appear on the face of the machine at this time. As a further precaution in insuring proper operation of the machine, an empty switch 106 is disposed in the magazine. This resiliently mounted switch will remain closed as long as a record in the magazine presses against it. However, when the supply of records is exhausted, or if the records hang up in the magazine, the switch will open and further steps in the operation cannot be initiated until the condition is corrected.

When a record blank is properly moved into position it will not drop down due to the holding action of drop plates 52. However, when the cross member moves down, the abutments 68 thereon engage the crank arms 66 whereby the drop plates are retracted. At the same time, the rod 84 is lowered whereby the end 100 is positioned within the guide pin 98. These parts are arranged so that the rod will pass through the hole 104 of the blank and be in the lowered position by the time the mechanism 50 operates. Thus, the blank will be confined during its downward movement by the spindle and will settle on the table 94 in the proper position. This blank will then be ready for recording by the next individual to use the machine. It will be noted that the sleeve 86 and the member 82 are spaced apart when the spindle is in the lowered position. With this arrangement, the rod is positioned with respect to the pin 94 before the abutment means 68 engage crank arms 66 to cause retraction of the drop plates 52.

The mechanisms of this invention are particularly advantageous since the movements thereof can be synchronized to provide for quick, efficient disposition of the record blanks. Thus, the raising of the cross member 70 can be initiated as soon as a recording stage is completed by sending a pulse at this time to the motor 76. At the top of the stroke of the rod 84 a switch can be mechanically actuated to stop the motor 76 and to start the motor 37. Again, a mechanically operated switch can start the motor 76 when the slide plate 22 has placed the record blank in position so that the rod 84 will start down without delay.

When the rod 84 rests adjacent the guide pin 98 on the turntable, it is preferred that no friction be created due to contact thereof. The driving clearance which is provided permits free turning of the turntable with respect to the rod during recording. Adjustment of the position of the sleeve 90 permits achievement of the desired clearance. The spring 88, located around the rod 84 between the sleeve 90 and the member 82, serves to steady the rod during the recording operation.

The sliding plate mechanism described is particularly advantageous since its unitary construction provides a particularly convenient means for feeding record blanks. The drive means for reciprocating this sliding plate are relatively uncomplicated and represent a particularly reliable construction. Due to the simplicity of the sliding plate and the drive means therefor, and also due to the design of the abutting and separating edges of the slide plate, exceptionally reliable operation has been realized. Furthermore, the clearance between the ends 46 of the pillars 12 and the floor of the magazine defined by the plate 10 cooperates to provide a highly satisfactory operation. All these factors enable the use of a relatively large stack of records, since the weight of the records will not detract from the operating capabilities of the mechanisms.

It will be understood that various modifications may be made in the above described apparatus which provide the characteristics of this invention without departing from the spirit thereof, particularly as defined in the following claims.

I claim:

1. In an apparatus for recording on recording blanks wherein a plurality of blanks are disposed in a magazine, the improvement in means for delivering said blanks to a recording turntable comprising a plate construction, a sliding plate reciprocally movable in said construction, an opening defined in said sliding plate sufficiently large to receive one of said blanks, means for reciprocally moving said sliding plate whereby said opening can be disposed adjacent said magazine and a blank received therein, abutting edges on said sliding plate being adapted to engage a record blank and to move the blank out of said magazine when said reciprocating means moves the sliding plate opening away from said magazine, an opening defined in the bottom of said construction sufficiently large to receive one of said blanks, said reciprocating means being adapted to bring said openings into registry, means associated with said construction opening for releasably restraining a blank moved over this opening, a vertically reciprocal spindle rod centrally disposed with respect to a blank located over the construction opening, means for moving the lower end of the rod to a point above the level of this blank, said turntable being located beneath said construction opening, the moving means for said rod being adapted to move the rod downwardly through a hole in the center of a blank to a point adjacent said turntable, and the restraining means for this blank being adapted to release the blank whereby it will fall downwardly to said turntable while being confined by said rod.

2. An apparatus in accordance with claim 1 wherein said sliding plate has abutting edges approximately equal in thickness to the thickness of a single blank, said plate sliding adjacent the floor of said magazine whereby only the bottom record is engaged by the abutting edges, and means spaced from the floor of the magazine adjacent the exit end thereof, said spacing being greater than the thickness of one record but less than the thickness of two whereby only one record at a time can pass out of the magazine.

3. An apparatus in accordance with claim 2 wherein said abutting edges comprise a pair of edges adapted to engage opposite sides of a blank, said sliding plate also including a sharper separating edge disposed between said abutting edges, said abutting and separating edges being beveled to facilitate separation of said blanks.

4. An apparatus in accordance with claim 1 wherein said sliding plate extends on both sides of the construction opening, said reciprocating means being located on the side of the plate opposite said magazine and including a horizontally disposed rotary disk and pins extending outwardly therefrom, two rows of oppositely disposed teeth formed in said sliding plate and adapted to be engaged by said pins, whereby rotation of said disk causes said pins to engage one row of teeth for movement of said sliding plate in one direction and continued rotation of said disk causes said pins to engage the other row of teeth for movement of said sliding plate in the opposite direction.

5. An apparatus in accordance with claim 1 including a movable cross member and means for reciprocally moving said member in a vertical plane above said construction, means on said member for engaging said spindle rod during vertical ascent for raising said rod, and means on said member for operating said restraining means during vertical descent to thereby release the blank held by the restraining means.

6. An apparatus in accordance with claim 5 wherein the drive means for said cross member comprises a rotary disk having an outwardly extending pin in one face near the periphery thereof, a slot defined in said cross member for receiving said pin, whereby rotation of said disk through one revolution results in said ascent and descent of said member.

7. An apparatus in accordance with claim 1 including an upstanding pin on said turntable, means on said spindle rod for controlling the lowermost position thereof, said rod when lowered being closely adjacent to but out of contact with said pin on the turntable, whereby a record blank will be completely confined by said rod when dropping onto said turntable and whereby clearance between said rod and pin is provided during recording.

8. An apparatus in accordance with claim 1 wherein the means for releasably restraining the blank comprise a pair of oppositely disposed slide members adapted to move into and out of blocking positions for said openings, a pair of crank means operatively connected to said slide members, and abutment means on said moving means for the spindle rod for engaging one arm of each crank means to thereby operate said slide members.

9. In an apparatus for recording on record blanks wherein a plurality of blanks are disposed in a magazine, the improvement in means for delivering said blanks to a recording turntable comprising a plate construction defining an interior portion, a sliding plate located for reciprocal sliding movement within said interior, an opening defined in said sliding plate sufficiently large to receive one of said blanks, means for reciprocally moving said sliding plate whereby said opening can be disposed adjacent said magazine and the lowermost blank in the magazine received within the opening, abutting edges on said sliding plate being adapted to engage said lowermost blank and to move this blank out of said magazine when said reciprocating means moves the sliding plate opening away from said magazine, an opening defined in the bottom of said construction sufficiently large to receive a blank moved from said magazine, said reciprocating means being adapted to bring said openings into registry, means associated with said construction opening for releasably restraining a blank moved over this opening, a vertically reciprocal spindle rod centrally disposed with respect to a blank located over the construction opening, means for moving the lower end of the rod through a blank disposed in this manner, said turntable being located beneath said construction opening, the moving means for said rod being adapted to move the rod downwardly through a hole in the center of a blank to a point adjacent said turntable, and the restraining means for this blank being adapted to release the blank in response to downward movement of said rod whereby the blank will fall downwardly to said turntable while being confined by said rod.

10. An apparatus in accordance with claim 9 wherein upstanding pillars are provided for defining said magazine, the lower end of at least one of the pillars at the exit end of the magazine being spaced from the floor of the magazine, said spacing being greater than the thickness of one blank but less than the thickness of two whereby only one blank at a time can pass out of said magazine.

11. An apparatus in accordance with claim 10 including means associated with said pillars at the exit end of the magazine adapted to provide for minute adjustments in said spacing.

12. An apparatus in accordance with claim 9 wherein the means for moving the spindle rod are adapted to operate as soon as a recording operation is completed, means operative to stop said rod moving means when the uppermost position thereof is reached, means for initiating movement of said sliding plate when said rod moving means stops at its uppermost point, means for stopping said sliding plate when it reaches said position of registry, means operating in response to positioning of said sliding plate for initiating downward movement of said rod, and means for operating in response to this downward movement for releasing the blank held by said restraining means.

13. In an apparatus for recording on record blanks wherein a plurality of blanks are disposed in a stack resting on the floor defined by a magazine, the improvement in means for delivering said blanks to a recording turntable comprising a slidable plate movable adjacent one end of said magazine, an opening defined by said plate sufficiently large to receive a blank, said turntable being disposed beneath said plate, means for moving said plate whereby the opening thereof is located in registry with said magazine whereby a blank at an end of said stack can be received in said opening, means for moving said plate whereby the opening therein is located in a position over said turntable, means for depositing a blank positioned in said opening on said turntable, said sliding plate being provided with abutting edges approximately equal in thickness to the thickness of a single blank, said plate sliding adjacent said end of said magazine whereby only the blank at said end of said stack is engaged by said abutting edges, said magazine defining an exit, and means spaced from said end of the magazine adjacent the exit, the spacing between said last mentioned means and said end of the magazine being greater than the thickness of one blank but less than the thickness of two blanks whereby only one blank at a time can pass out of the magazine.

14. In an apparatus for recording on record blanks wherein a plurality of blanks are disposed in a stack resting on the floor defined by a magazine, the improvement in means for delivering said blanks to a recording turntable comprising a slideable plate movable adjacent the floor of said magazine, an opening defined by said plate sufficiently large to receive a blank, said plate being disposed beneath said plate, means for moving said plate whereby the opening thereof is located in a position adjacent the bottom of said stack whereby a blank can be received in said opening, means for moving said plate whereby the opening therein is located in a position over said turntable, means for depositing a blank positioned in said opening on said turntable, said sliding plate being provided with abutting edges approximately equal in thickness to the thickness of a single blank, said plate sliding adjacent the floor of said magazine whereby only the bottom blank is engaged by said abutting edges, said magazine defining an exit, and means spaced from the floor of the magazine adjacent the exit, the spacing between said last mentioned means and the floor being greater than the thickness of one blank but less than the thickness of two blanks whereby only one blank at a time can pass out of the magazine.

15. An apparatus in accordance with claim 14 wherein said abutting edges comprise a pair of edges adapted to engage opposite sides of a blank, said sliding plate also including a sharper separating edge disposed between said abutting edges, said abutting and separating edges being beveled to facilitate separation of said blanks.

References Cited by the Examiner
UNITED STATES PATENTS

| 2,148,531 | 2/39 | Cartmell | 274—10 |
| 2,153,864 | 4/39 | Faust | 274—10 |

NORTON ANSHER, *Primary Examiner.*